United States Patent
Ahn et al.

(10) Patent No.: US 11,582,189 B2
(45) Date of Patent: Feb. 14, 2023

(54) METHOD FOR FILTERING COMMUNICATION DATA ARRIVING VIA A COMMUNICATION CONNECTION, IN A DATA PROCESSING DEVICE, DATA PROCESSING DEVICE AND MOTOR VEHICLE

(71) Applicant: Audi AG, Ingolstadt (DE)

(72) Inventors: Changsup Ahn, Ingolstadt (DE); Kamil Zawadzki, Munich (DE); Markus Klein, Pförring (DE); Hans Georg Gruber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 369 days.

(21) Appl. No.: 16/632,611

(22) PCT Filed: Aug. 22, 2018

(86) PCT No.: PCT/EP2018/072629
§ 371 (c)(1),
(2) Date: Jan. 21, 2020

(87) PCT Pub. No.: WO2019/038317
PCT Pub. Date: Feb. 28, 2019

(65) Prior Publication Data
US 2020/0244624 A1 Jul. 30, 2020

(30) Foreign Application Priority Data
Aug. 22, 2017 (DE) .................. 10 2017 214 624.9

(51) Int. Cl.
*H04L 9/40* (2022.01)
*G06F 13/42* (2006.01)
(Continued)

(52) U.S. Cl.
CPC ...... *H04L 63/0245* (2013.01); *G06F 13/4282* (2013.01); *G06F 21/44* (2013.01);
(Continued)

(58) Field of Classification Search
CPC . H04L 63/20; H04L 63/0227; H04L 63/0245; H04L 9/32
See application file for complete search history.

(56) References Cited

U.S. PATENT DOCUMENTS

| 7,694,047 B1 | 4/2010 | Alston |
| 2005/0182950 A1 | 8/2005 | Son et al. |

(Continued)

FOREIGN PATENT DOCUMENTS

| DE | 102005055419 B3 | 4/2007 |
| DE | 102012017339 A1 | 3/2014 |
| EP | 2983088 A1 | 2/2016 |

OTHER PUBLICATIONS

International Preliminary Report on Patentability directed to related International Patent Application No. PCT/EP2018/072629, completed Aug. 1, 2019 with attached English-language translation; 11 pages.

(Continued)

*Primary Examiner* — Shaqueal D Wade-Wright
(74) *Attorney, Agent, or Firm* — Sterne, Kessler, Goldstein & Fox P.L.L.C.

(57) ABSTRACT

A method for filtering communication data arriving from a communication partner via a communication connection, which provides access to at least one storage means of a receiving data processing device having at least one computation unit, in the data processing device, wherein PCI Express, in an interface unit, receiving the communication data, of the data processing device, a filter means, at least part of which is embodied as hardware, is used so that, (Continued)

S1 = Receive communication data
S2 = Is authorization condition met?
S3 = Reject data packet
S4 = Process communication data
S5 = Is an attack detected?
S6 = Reconfigure filter means according to configuration information, prescribed on the data processing device, containing at least one approval condition that rates the at least one property of the useful data contained in the communication data, only the communication data meeting at least one approval condition are forwarded from the interface unit to at least one further component of the data processing device.

19 Claims, 2 Drawing Sheets

(51) Int. Cl.
    *G06F 21/44*     (2013.01)
    *G06F 21/60*     (2013.01)
    *G06F 21/85*     (2013.01)

(52) U.S. Cl.
    CPC ............ *G06F 21/606* (2013.01); *G06F 21/85* (2013.01); *G06F 2213/0026* (2013.01)

(56) References Cited

U.S. PATENT DOCUMENTS

| | | |
|---|---|---|
| 2006/0136338 A1 | 6/2006 | Maor |
| 2008/0016313 A1 | 1/2008 | Murotake et al. |
| 2008/0163356 A1* | 7/2008 | Won-Jip .............. H04L 63/1441 726/13 |
| 2014/0032800 A1* | 1/2014 | Peirce .................... H04L 67/12 710/105 |
| 2014/0380433 A1* | 12/2014 | Yerger .................... H04L 69/08 726/4 |
| 2020/0043251 A1* | 2/2020 | Stählin .................. G07C 5/008 |
| 2022/0131834 A1* | 4/2022 | Kleine .................... H04W 4/40 |

OTHER PUBLICATIONS

International Search Report and Written Opinion of the International Searching Authority directed to related International Patent Application No. PCT/EP2018/072629, dated Nov. 30, 2018, with attached English-language translation; 16 pages.

"Microchip MCP2515, Stand-Alone CAN Controller with SPI Interface," Microchip Technology Inc., May 31, 2003, 94 pages, available at: http://ww1.microchip.com/downloads/en/Device/Doc/MCP2515-Stand-Alone-CAN-Controller-with-SPI-20001801J.pdf.

* cited by examiner

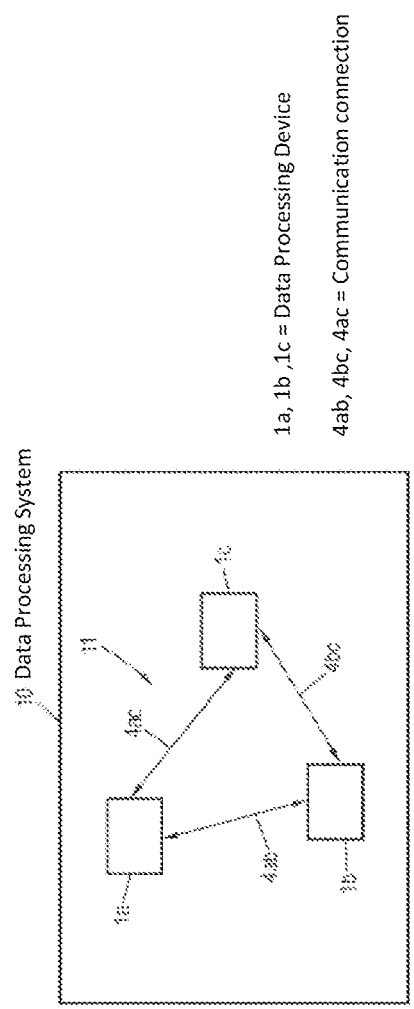

METHOD FOR FILTERING COMMUNICATION DATA ARRIVING VIA A COMMUNICATION CONNECTION, IN A DATA PROCESSING DEVICE, DATA PROCESSING DEVICE AND MOTOR VEHICLE

TECHNICAL FIELD

The present disclosure relates to a method for filtering communications data, arriving from a communications partner via a communications connection that allows access to at least one storage means of a receiving data processing device, in the data processing device, a data processing device, and a motor vehicle.

BACKGROUND

Today, modern data processing systems, as part of overall apparatuses, for example motor vehicles, are becoming increasingly complex owing to the increasing demands on the performance capability of said data processing systems, as well as the technological possibilities for optimizing said data processing systems. In this case, technologies which are also used for conventional personal computers are increasingly used, even in other overall apparatuses, for example motor vehicles. Technologies of this kind also comprise in particular packet-based point-to-point communications standards, in particular the PCI Express communications standard (PCIe communications standard), which is typically used in order, for example, to connect peripheral devices to a chipset in a personal computer. PCI Express is one of the fastest available communications methods. Typical applications for PCI Express are applications in which large volumes of data have to be processed and/or transmitted in extremely short periods of time. In order to establish connections for example between one chipset and a plurality of peripheral devices, it is known to interpose bridging means, which can be designed for example as a multiplexer, switch, or the like. Bridging means of this kind can be "transparent" or "non-transparent," and, therefore, act directly as a communications partner or allow a data processing device that can be reached via the bridging means to appear as a direct communications partner. A plurality of different architectures are possible and known.

In the case of communications standards such as PCI Express, the communications partners conventionally obtain direct access to storage means and arithmetic units of the data processing devices communicating therewith. This is also the case if overall apparatuses or the data processing systems thereof comprise security-critical parts which are intended to communicate with less safety-critical regions. For example, it is known in motor vehicles to consider driving and/or security system-related controllers as data processing devices, in particular also with respect to autonomous driving, to be rather security-critical data processing devices and which should therefore be associated with a security region, but which nonetheless are intended to communicate with data processing devices, in particular further controllers, assessed as less security-critical.

However, providing a bidirectional connection that allows access to storage means and/or arithmetic units in the security-critical data processing device would allow data processing devices classed as less security-critical, as communications partners, to carry out manipulations within the security-critical data processing device, for example, if the less security-critical communications partner has been hacked or replaced and/or the communications data were manipulated during transmission via the communications connection.

The simplest conceivable way for preventing an incentive of this kind would be that of providing only a monodirectional connection from the security region to the less security-critical communications partners. Although a solution of this kind would be secure, it is not realistic because assemblies without a feedback channel cannot be controlled/administered expediently. The replaceability of such an approach is therefore rather to be considered as restricted.

In another approach, it would be conceivable to provide a highly restricted feedback channel from less security-critical communications partners to the security-critical data processing device which restricts the possibilities of attack on the security-critical side. For example, only actuation signals without any payload can be received. However, a limitation of this kind has to be implemented as separate hardware, which is laborious and significantly limits the functionality of the feedback channel.

DE 10 2012 017 339 A1 relates to a computer system comprising at least two CPUs which each comprise a PCIe bus hierarchy, by means of which messages, which each comprise an origin address, a destination address, and a payload, can be transmitted between connected communications devices. The PCIe bus hierarchies are connected by a bridging means, such that messages can be exchanged between communications devices that are connected to different PCIe bus hierarchies, the computer system comprising at least one peripheral device having a communications device which can be used jointly by the CPUs, the bridging means comprising a translation means, which is designed for translating the destination address of messages that are transmitted from one PCIe bus hierarchy to another. In this context, it is also proposed to arrange observation devices, for monitoring the messages transmitted by the bridging means, between the bridging means and the PCIe hierarchies. In order to protect PCIe bus hierarchies that are connected to the bridging means, destination addresses and origin addresses can be evaluated, in order to reject messages if necessary.

Thus, observation devices are provided there at central positions in the data processing systems, which devices are to be configured as a whole. This solution is complex and inflexible, in particular if the observation devices are also subject to configuration access of less security-critical data processing devices.

BRIEF DESCRIPTION OF DRAWINGS/FIGURES

FIG. 3 shows a definition of security levels, in accordance with some embodiments.

FIG. 4 shows a schematic sketch of a motor vehicle, in accordance with some embodiments.

DETAILED DESCRIPTION

Figure 1:
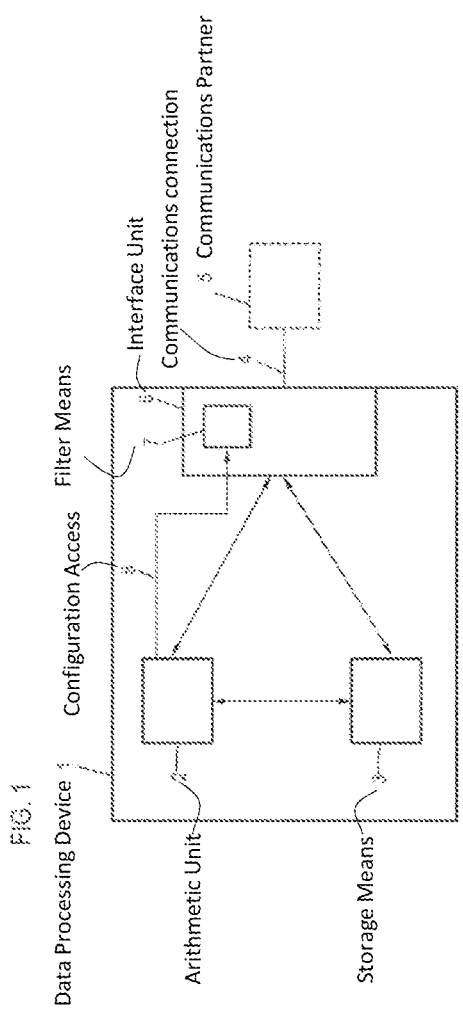
FIG. 1 shows a data processing device, in accordance with some embodiments.

The object of the present disclosure is therefore that of specifying a possibility for improved, more flexible, and more independent protection of data processing devices within a data processing system of an overall apparatus, in particular of a motor vehicle.

In order to achieve this object, in some embodiments, a method is disclosed. The method includes receiving, at an interface unit of the data processing device, the communications data, using a filter means that is implemented as hardware at least in part, in accordance with configuration information that is specified on the side of the data processing device. The filter means contains at least one authorization condition that assesses at least one property of the payload contained in the communications data, and forwards only communications data that fulfill the at least one authorization condition from the interface unit to at least one further component of the data processing device.

The present disclosure is therefore based on the concept of implementing a hardware-based firewall, in the form of a filter means, on the side of the receiving data processing device. The filter means is assessed as security-critical, or the data processing device located in a security region, in which firewall is implemented by an interface unit, for example, a PCIe controlling chip. In this case, the payload can comprise control commands acting on the at least one storage means, the filter means being applied at least to the control signals. However, the procedure described here can also be applied to other payloads in the communications data, since it can also be the case that other payloads can cause damage in the memory of a data processing device and/or in an arithmetic unit of a data processing device. Depending on the configuration information, the filter means can reduce the amount of the available payload, in particular control signals which are actually forwarded to the relevant components, i.e., in particular the storage means and/or arithmetic unit, to the amount that is necessary and ensures security. In this way, the attack surface is minimized by the communications connection, without having to omit a fully functional feedback channel.

In some embodiments, the filter means is configured by the data processing device itself using a separate configuration channel within the data processing device, in particular proceeding from the arithmetic unit, and/or an existing configuration interface of the interface unit. Accordingly, the data processing device in a data processing system has control over the incoming messages and messages to be filtered out, via the communications connection. Thus, the present disclosure protects against incoming attacks and provides maximum autonomy to the data processing device as a subsystem instead of opening up access to an observation device centrally manipulating throughout data processing system.

By means of non-limiting example, irrespective of whether portions of the data processing system are compromised, the data processing device can use its own firewall in the form of the filter means. There is no master device that could change the firewall configuration information, since only the data processing device itself can change the configuration. Furthermore, each data processing device can react to incoming attaches and reduce, or even entirely close, the communications connection by means of corresponding reconfiguration of the filter means.

In some embodiments, the filter means can assess the content of the communications data, i.e., the payload. While the approaches known in the prior art can be referred to as "stateless packet inspection," the present disclosure can be referred to as "stateful packet inspection." Therefore, the content, in addition to the origin, the destination, and the communications path that the communications data have taken, is assessed. Accordingly, to directly access the payload, authorization criterion can access corresponding properties of the communications data contained in the header of packet-based communication. Therefore, forming the filter means in hardware at least in part, i.e., in particular integration in a chip that forms the interface unit, further restricts the possibilities of manipulation.

In some embodiments, filtering the communications traffic within the data processing device itself, but outside of the arithmetic unit and the storage means, allows for strict separation in distributed systems of data processing devices. The filter means in the interface unit, i.e., in particular in an external chip, furthermore makes it possible to use more simple residual components, in particular arithmetic units, for example, CPUs, in security-critical data processing devices, which use the communications standard of the communications connection. Outsourcing the filter means in the interface unit thus reduces the complexity of the data processing device itself. The mechanism according to embodiments as described herein can also be used in multiplexed/demultiplexed communications connections. In particular, a bridging means that is used does not need to have any information about the filter processes.

In some embodiments, a communications connection according to the PCI Express (PCIe) communications standard is used. A PCIe communications connection in principle represents a packet-based point-to-point connection, which as described at the outset, can also be used for a plurality of communications partners, by way of bridging means.

In some embodiments, it may be possible for the filter means to be applied in a communications layer acting in accordance with a communications standard used in the communications connection for the physical transport of formatted communications data, in particular a transaction layer in PCI Express. In this manner, hardware-assisted filtering within the transaction layer is therefore possible. This means that the filtering can purposely be located as close as possible to the physical reception of the communications data, in order to minimize the influence thereof on the data processing device, in particular the storage means and/or the arithmetic unit. In the transaction layer, the data are still in the transmission format defined by the communications standard, here in particular PCI Express. If content, in particular payload, is intended to be accessed directly by means of at least one authorization condition, and the payload is encrypted, a filter means of this kind would be provided directly following suitable decryption means.

In some embodiments, a filter means implemented as part of a microchip that forms the interface unit is used as the filter means. The filter means can thus be implemented in concrete terms by means of hardware, by modifying a corresponding interface unit microchip, and therefore be firmly integrated in the processing sequence, in terms of the hardware. This can in particular be a PCIe chip.

In some embodiments, the filter means can preferably be configured exclusively by the data processing device itself, in particular exclusively, by the arithmetic unit. In this case, the arithmetic unit, for example, a CPU, thus preferably has exclusive configuration access to the filter means, which ensures the greatest possible autonomy and flexibility of the data processing device itself, according to which it is also possible, for example, to respond to attacks by means of the authorization conditions being made stricter or the communications connection being entirely deactivated.

In some embodiments, at least one of the authorization conditions assessing at least one payload may check a minimum length and/or maximum length of a payload unit, a control command, a restriction of the function type of a control command described by the payload, and/or a restriction of the accessible memory region of the at least one storage means. Therefore, a restriction of the admissible payload in the communications data can be defined, initially for example by the length of a payload unit, which is intended to be written into a memory region of the storage means for example. It is thus possible to assume, for example, that the smaller a payload unit, for example, a control command, is, the less damage a malicious payload unit can do in the data processing device. It is also possible, in the communications standard and/or by means of a corresponding design of the filter means, to distinguish between different function types in the case of control commands described by the payload, for example, for said types to be classified in different manners, with the result that, according to a particularly preferred embodiment of the invention, an authorization condition excludes certain function types/function classes. This in turn excludes certain types of access, in particular to storage means, in the data processing device, for example write access, manipulation access and the like.

In some embodiments, the memory region in which the payload of the communications data may be stored can be restricted. Due to the corresponding structure thereof, payloads/control commands frequently aim at the use of certain memory regions of storage means of the data processing device, which regions may be particularly relevant for the security-critical functionality of the data processing device, as a result of which such particularly security-critical regions can be excluded for example by an authorization condition. By way of non-limiting example, authorization conditions for all these criteria can be used, for example, for workaround solutions such as fragmentation of overall commands in the case of size restrictions and the like to be avoided.

In some embodiments, in addition to the contents-related authorization conditions, further authorization conditions can be used, by means of which conditions a communication attribute describing the communications connection and/or the communications partner is evaluated. For example, in the case of the PCI Express communications standard it is known to identify the relevant communications partner within the communications information as well as the communications connection to said communications partner that is specifically used, if a plurality of communications connections are used. Thus, the filter means can provide restrictions.

In some embodiments, the configuration information may describe a security level having associated authorization conditions and/or parameters of the authorization conditions. Therefore, specific predetermined configuration information can be used for different security levels, with the result that the corresponding security level can be adjusted to the filter means within the data processing device in a particularly simple manner, by means of configuration access. By way of non-limiting example, 16 security levels can be provided, which can thus be described, for example, by 2 bytes which relax restrictions for the communications data in a stepwise manner.

The procedure according to various embodiments as described herein can be used in a data processing system of a motor vehicle. By way of non-limiting example, the data processing device forms a part of a motor vehicle, in particular a controller, and communicates with the at least one communications partner which is part of a data processing system of the motor vehicle. As already explained at the outset, modern motor vehicles are a specific example for complex data processing systems in which a wide variety of security levels or security regions can be defined, for example as more security-critical controllers (vehicle guidance, in particular fully automated vehicle guidance, security systems and the like), and less security-critical controllers (infotainment, etc.). In this case, a mechanism allows for high-speed communication, for example, via PCI Express, comprising a feedback channel, but which nonetheless prevents, as far as possible, possibilities of manipulation from less security-critical controllers.

In some embodiments, a data processing device, in particular, a controller for a motor vehicle is disclosed. The data processing device comprises an interface element having a filter means, at least one storage means, and an arithmetic unit, and is designed to carry out the method according to the embodiments as described herein. In some embodiments, a motor vehicle comprising a data processing device according to embodiments as described in this disclosure is disclosed. All the disclosure with regard to the method according to various embodiments as described herein can be transferred analogously to the data processing device and the motor vehicle as described herein.

Various embodiments are described in following with reference to the drawings.

FIG. 1 shows a data processing device, in accordance with some embodiments. FIG. 1 shows a schematic sketch of a data processing device 1 that comprises at least one arithmetic unit 2 and at least one storage means 3. The data processing device 1 may further comprise at least one of the at least one storage means 3 to be implemented within the arithmetic unit 2, which can also be designed as a CPU for example. By way of non-limiting example, the data processing device 1 can be a controller of a motor vehicle.

In accordance with some embodiments, in order to be able to communicate with other data processing devices of the motor vehicle, for example further controllers and/or other data processing devices, for example display devices, communications connections are formed proceeding from the data processing device 1. At least one communications connection 4 to a communications partner 5 that is only indicated here uses the PCI Express communications standard (PCIe communications standard) for high-speed data transmission. Accordingly, one interface unit 6 of the data processing device 1 is designed as a PCIe microchip. By way of non-limiting example, filter means 7 which, owing to configuration information, checks incoming communications data against various authorization conditions, is integrated, in terms of hardware, into said interface unit 6, i.e., provided in a manner fixed in the corresponding microchip, the payload contained in the communications data also actually being forwarded to the further components of the data processing device 1, in this case the arithmetic unit 2 and the storage means 3, only if all the authorization conditions are fulfilled. Accordingly, at least one of the authorization conditions evaluates a property of the payload contained in the communications data, it being possible for further authorization conditions to also relate to the communications partner 5 and/or to the communications connection 4 itself. The communications partner 5 can furthermore be both what is known as an end point and an interposed switching means, for example, a bridging means, a switch and/or a multiplexer/demultiplexer.

In accordance with some embodiments, the filter means 7 can be configured only from within the data processing device 1, for example, by the arithmetic unit 2. By way of non-limiting example, a corresponding separate configuration channel can be provided for this purpose, but it is also possible to use a communications interface of the interface unit 6 that is used in any case for configuration purposes. The configuration access is indicated by the arrow 8 in FIG. 1.

Figure 2:
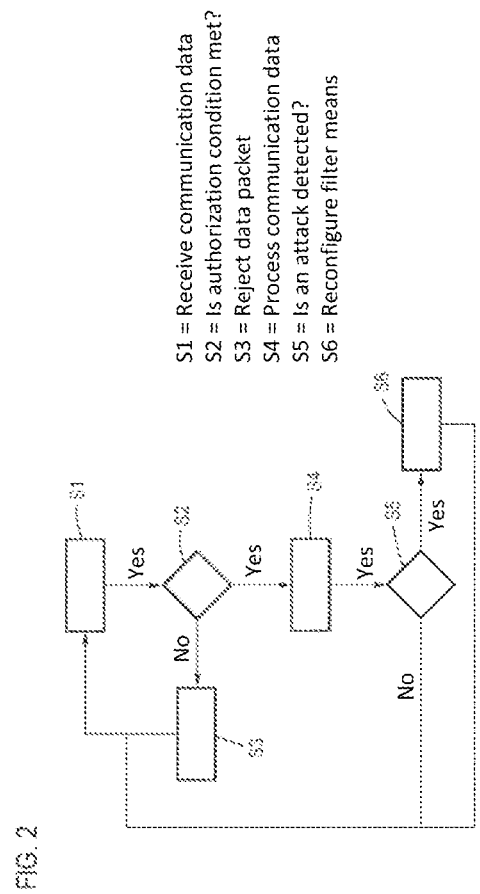
FIG. 2 shows an operating sequence of a method, in accordance with some embodiments.

FIG. 2 shows an operating sequence of a method, in accordance with some embodiments. FIG. 2 explains in more detail the operating sequence of an embodiment of the method as can be implemented in the data processing device 1. In this case, in a step S1 communications data comprising a payload and a header are received, in the present case as data packets. After passing through the physical layer and the datalink layer, the communications data reach the transaction layer, where the data packets (transaction layer packets—TLP) encounter the filter means 7. The corresponding filtering, i.e., checking all the authorization conditions for each incoming data packet, takes place in step S2. If it is found, in the process, that at least one of the authorization conditions is not fulfilled, the data packet is rejected in step S3, and the method returns to step S1 again for the next data packet. However, if all authorization conditions are fulfilled, in a step S4 the communications data are processed further, as usual, in the interface unit 6, and forwarded to the further components 2, 3 of the data processing device 1.

In an optional step S5, it is possible to constantly monitor, within the arithmetic unit 2, whether an attack is present or can be detected. Reconfiguration (arrow 8) of the filter means 7 can take place in a step S6, for example the authorization conditions can be made stricter or the communications connection 4 can be entirely deactivated.

In accordance with some embodiments, specific security levels having associated configuration information, which describes the authorization conditions, are defined as shown in greater detail in table 9 of FIG. 3. In this case, each line corresponds to a security level L1, L2, etc. In this case, P1-P10 are parameters of authorization conditions. In this case, P1 and P2 describe the admissible serial numbers of communications connections, and P3 and P4 describe admissible serial numbers of communications partners. P5-P10 relate to contents-related authorization conditions. P5 and P6 describe the range of admissible function types (function classes), P7 and P8 admissible memory regions of the at least one storage means 3 in which data may be written, and P9 and P10 the minimum length and maximum length of payload units. In this case, payload units can correspond to control commands, but other payloads can also be processed by the filter means 7.

By way of non-limiting example, security level L1 may not be associated with any restrictions in the communication, while security level L16 allows only signals on the first communications connection for the communications partner no. 16 and the first function class. The target memory region and the amount of data are likewise clearly defined and restricted.

A suitable security level L1, L2, etc. can, as described, also be selected dynamically by means of the arithmetic unit 2.

FIG. 4 shows a schematic sketch of a motor vehicle, in accordance with some embodiments. FIG. 4 shows a schematic sketch of a motor vehicle 10 that comprises a data processing system 11 which comprises a plurality of data processing devices 1A, 1B and 1C according to the embodiments as described herein. Only three data processing devices are shown for reasons of simple illustration. Communications connections 4ab, 4ac, 4bc exist in each case between the data processing devices 1a, 1b and 1c, which communications connections are operated in accordance with the PCI Express communications standard. Filter means 7 operated according to the invention are provided within the data processing devices 1a, 1b and 1c in each case, such that each data processing device 1a, 1b and 1c can ensure its own security in an autonomous manner and at an increased level of reliability, i.e., in particular irrespective of impairments of other parts of the data processing systems 11.

The invention claimed is:

1. A method for filtering communications data, the method comprising:
   receiving, at a data processing device of a plurality of data processing devices, communications data from a first communications partner via a communications connection;
   accessing at least one storage means of the data processing device, wherein the data processing device comprises at least one arithmetic unit, wherein the data processing device forms a part of a data processing system of a motor vehicle, and wherein the motor vehicle comprises the plurality of data processing devices;
   assessing, by a filter means, a content of the communications data;
   reconfiguring the filter means, by the data processing device, to make the authorization conditions stricter or completely deactivate the communications connection, in response to the content of the communications data;
   assessing, using the reconfigured filter means, at least one property of a payload of the communications data for verification of at least one authorization condition, wherein the filter means is partially implemented as hardware according to predetermined configuration information;
   communicating, from the data processing device to a second communications partner, via an interface unit of the data processing device, the communications data that succeeded verification of the at least one authorization condition, wherein the second communications partner is part of the data processing system of the motor vehicle; and
   forwarding the communications data that succeeded verification of the at least one authorization condition to at least one other component of the data processing device, wherein the at least one other component of the data processing device comprises the at least one arithmetic unit, and the at least one storage means.

2. The method of claim 1, further comprising establishing the communications connection as a packet-based point-to-point connection according to PCI Express communications standard.

3. The method of claim 1, wherein the filter means is implemented in a communications layer acting in accordance with a communications standard used in the communications connection for physical transport of formatted communications data.

4. The method of claim 3, wherein the communications layer comprises a transaction layer of PCI Express communications standard.

5. The method of claim 1, wherein the filter means is implemented as part of a microchip that forms the interface unit.

6. The method of claim 1, wherein the assessing comprises configuring the filter means by the at least one arithmetic unit.

7. The method of claim 1, wherein the assessing comprises assessing the at least one authorization condition that comprises minimum length or maximum length of the payload of the communications data, a control command described by the payload, a restriction of a function type of the control command, or a restriction of an accessible memory region of the at least one storage means.

8. The method of claim 1, wherein the assessing comprises assessing the at least one authorization condition that comprises checking the communications connection or the second communications partner.

9. The method of claim 1, wherein the predetermined configuration information comprises a security level having associated authorization conditions, or parameters of the authorization conditions.

10. The method of claim 1, wherein the data processing device is a controller.

11. A data processing device of a data processing system of a motor vehicle, the data processing device comprising:
an interface unit that comprises a filter means;
a storage means communicatively coupled with the interface unit; and
an arithmetic unit communicatively coupled with the storage means and the interface unit, wherein the arithmetic unit is configured to perform operations comprising:
receiving communications data from a first communications partner via a communications connection;
assessing, by a filter means, a content of the communications data;
reconfiguring the filter means, by the data processing device, to make the authorization conditions stricter or completely deactivate the communications connection, in response to the content of the communications data;
assessing, using the reconfigured filter means, at least one property of a payload of the communications data for verification of at least one authorization condition, wherein the filter means is partially implemented as hardware according to predetermined configuration information;
communicating, from the data processing device to a second communications partner, via an interface unit of the data processing device, the communications data that succeeded verification of the at least one authorization condition, wherein the second communications partner is part of the data processing system of the motor vehicle; and
forwarding the communications data that succeeded verification of the at least one authorization condition to at least one other component of the data processing device, wherein the at least one other component of the data processing device comprises the arithmetic unit and the storage means.

12. The data processing device of claim 11, wherein the data processing device is further configured to establish the communications connection as a packet-based point-to-point connection according to PCI Express communications standard.

13. The data processing device of claim 11, wherein the data processing device is further configured to implement the filter means in a communications layer acting in accordance with a communications standard used in the communications connection for physical transport of formatted communications data.

14. The data processing device of claim 11, wherein the data processing device is further configured to assess the at least one authorization condition that comprises minimum length or maximum length of the payload of the communications data, a control command described by the payload, a restriction of a function type of the control command, or a restriction of an accessible memory region of the at least one storage means.

15. The data processing device of claim 11, wherein the predetermined configuration information for implementing the filter means comprises a security level having associated authorization conditions, or parameters of the authorization conditions.

16. The data processing device of claim 11, wherein a communications layer comprises a transaction layer of PCI Express communications standard.

17. The data processing device of claim 11, wherein the filter means is implemented as part of a microchip that forms the interface unit.

18. The data processing device of claim 11, wherein the filter means is configured by the at least one arithmetic unit while assessing the content of the communication data.

19. A motor vehicle comprising a data processing device, wherein the data processing device is part of a data processing system of the motor vehicle, and wherein the data processing device comprises:
an interface unit that comprises a filter means;
a storage means communicatively coupled with the interface unit; and
an arithmetic unit communicatively coupled with the storage means and the interface unit, wherein the arithmetic unit is configured to perform operations comprising:
receiving communications data from a first communications partner via a communications connection;
assessing, by a filter means, a content of the communications data;
reconfiguring the filter means, by the data processing device, to make the authorization conditions stricter or completely deactivate the communications connection, in response to the content of the communications data;
assessing, using the reconfigured filter means, at least one property of a payload of the communications data for verification of at least one authorization condition, wherein the filter means is partially implemented as hardware according to predetermined configuration information;
communicating, from the data processing device to a second communications partner, via an interface unit of the data processing device, the communications data that succeeded verification of the at least one authorization condition, wherein the second communications partner is part of the data processing system of the motor vehicle; and
forwarding the communications data that succeeded verification of the at least one authorization condition to at least one other component of the data processing device, wherein the at least one other component of the data processing device comprises the arithmetic unit and the storage means.

* * * * *